W. C. WINFIELD.
FAUCET.
APPLICATION FILED JUNE 24, 1907.
914,473.
Patented Mar. 9, 1909.
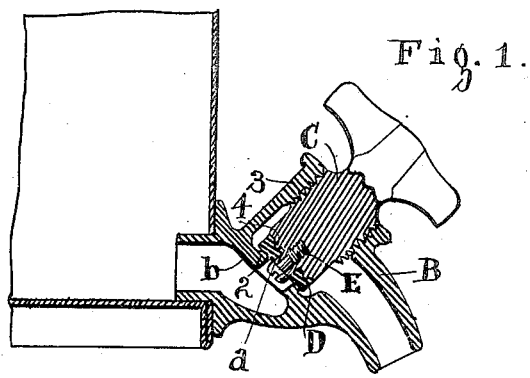
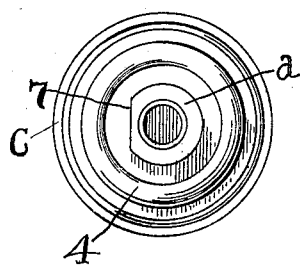  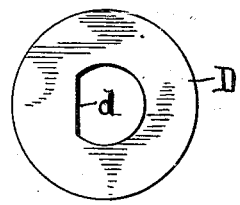
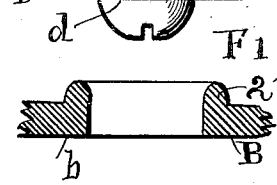
WITNESSES:
C. M. Fisher
J. C. Museum
INVENTOR.
William C. Winfield.
BY
Fisher & Moser
ATTORNEYS

UNITED STATES PATENT OFFICE.

WILLIAM C. WINFIELD, OF WARREN, OHIO, ASSIGNOR TO THE WINFIELD MANUFACTURING COMPANY, OF WARREN, OHIO, A CORPORATION OF OHIO.

FAUCET.

No. 914,473.        Specification of Letters Patent.        Patented March 9, 1909.

Application filed June 24, 1907. Serial No. 380,374.

*To all whom it may concern:*

Be it known that I, WILLIAM C. WINFIELD, a citizen of the United States, residing at Warren, in the county of Trumbull and State of Ohio, have invented certain new and useful Improvements in Faucets, and do declare that the following is a full, clear, and exact description of the invention, which will enable others skilled in the art to which it appertains to make and use the same.

My invention relates to improvements in faucets, and the invention consists in a faucet more particularly adapted for use with oil cans, though not limited to such use, all substantially as shown and described and particularly pointed out in the claim.

In the accompanying drawings, Figure 1 shows a section of a can or vessel and a longitudinal sectional elevation of my improved faucet fixed therein. Fig. 2 is an enlarged sectional elevation of the body of the valve or plug, and Fig. 3 is a cross section of the valve disk or washer and a full view of the screw that engages the same to the plug. In this figure, the washer is shown with grooves and as it would appear after subjection to compression. Fig. 4 is a sectional elevation of a portion of the diaphragm in the faucet containing the valve seat. Fig. 5 is a bottom view of the body or plug and Fig. 6 a plan of the washer showing a flat surface and in the form as it originally comes to the faucet.

I am of course aware that faucets adapted to be used like the present faucet, have been made heretofore, but my experience with such faucets as hitherto made has led me to make material changes in their construction, whereby leakage is prevented and economy in manufacture is obtained.

Now, in my improved faucet, B represents the faucet body, which is provided with a diaphragm *b* across the passage through the same having an annular and preferably raised valve seat, 2, an internally threaded barrel portion 3 adapted to receive plug or valve body C and a ring shaped extension *a* centrally with its annular sealing bead 4. Said valve is externally threaded to screw into said barrel, and depends upon its threaded engagement with body B for adjustment to and from its seat and to open and close the passage way through the faucet.

D represents a preferably hard rubber seating disk or washer, which takes the wear and tear of seating contact and is removably secured to plug C by a central screw E entering extension *a* on its bottom. Said washer is adapted to fit closely upon extension *a* and has a straight portion *d* to match flat surface 7 on one side of extension *a* and thereby lock said washer from rotation on said extension. By employing a special extension *a* for engaging the washer and locking it thereon so that it must rotate therewith it is dislodged from its seat as a first movement and then screw E holds its place and the whole construction is perfectly secure. Said extension is tubular and is internally threaded to receive the screw, and the head of the screw is itself wide enough to bear upon the washer across the annular space 8 therein which makes room for said extension.

To reduce the cost of manufacture, the plug or valve and the body of the faucet are mere cast metal parts without machine work or other finishing labor which will smooth their original rough surfaces. In fact, their necessarily low sale price precludes special machine work. Hence the bottom of the plug or valve like the remainder thereof has only an ordinary rough casting surface, and it usually follows that when a disk like D is engaged thereupon by a screw E there is always liability of leakage between said parts. But with my improved construction, I have in fact made the faucet leakage proof by concentrating the bearing by the plug on the washer upon a small circular or ring shaped area across which the liquid cannot or at least does not escape. This is the function of circular bead or rib 4 on the bottom or seating end of the plug, which bears upon washer D at 5 opposite the circular valve seat or rib 2 and makes the contact so close at these points that no leakage can occur.

What I claim is:—

A faucet body having a barrel on its top internally threaded in its outer portion and a diaphragm in the bottom of the barrel having a central opening and a raised valve seat about said opening, a plug valve engaged in the threads of said barrel and having a circular bead at its bottom opposite said valve seat and a projection within said bead provided with a flat side, and a washer locked on said projection against rotation thereon and a screw fixing said washer in place.

In testimony whereof I sign this specification in the presence of two witnesses.

WILLIAM C. WINFIELD.

Witnesses:
   E. M. FISHER,
   F. C. MUSSUN.